United States Patent [19]
Yamaguchi

[11] Patent Number: 5,140,215
[45] Date of Patent: Aug. 18, 1992

[54] VIBRATOR AND ULTRASONIC MOTOR EMPLOYING THE SAME

[75] Inventor: Masaki Yamaguchi, Gifu, Japan

[73] Assignee: Brother Kogyo Kabushiki Kaisha, Nagoya, Japan

[21] Appl. No.: 408,237

[22] Filed: Sep. 18, 1989

[30] Foreign Application Priority Data

Sep. 19, 1988 [JP] Japan ............... 63-234450
Feb. 28, 1989 [JP] Japan ............... 1-46866

[51] Int. Cl.⁵ .................................... H01L 41/08
[52] U.S. Cl. ........................ 310/323; 310/328
[58] Field of Search .................... 310/323, 328

[56] References Cited

U.S. PATENT DOCUMENTS

| | | | |
|---|---|---|---|
| 3,937,990 | 2/1976 | Winston | 310/323 |
| 3,980,906 | 9/1976 | Kuris | 310/323 |
| 4,019,073 | 4/1977 | Vishnevsky et al. | 310/323 |
| 4,065,687 | 12/1977 | Mishiro | 310/314 |
| 4,453,103 | 6/1984 | Vishnevsky et al. | 310/323 |
| 4,523,120 | 6/1985 | Assard et al. | 310/323 |
| 4,620,121 | 10/1986 | Mishiro | 310/323 |
| 4,703,214 | 10/1987 | Mishiro | 310/323 |
| 4,705,980 | 11/1987 | Mishiro | 310/323 |
| 4,728,843 | 3/1988 | Mishiro | 310/323 |
| 4,742,260 | 5/1988 | Shimizu et al. | 310/323 |
| 4,812,697 | 3/1989 | Mishiro | 310/323 |
| 4,833,359 | 5/1989 | Tanoue et al. | 310/323 |
| 4,857,793 | 8/1989 | Okuno | 310/323 |
| 4,893,045 | 1/1990 | Honda | 310/323 |
| 4,893,046 | 1/1990 | Honola | 310/323 |
| 4,912,351 | 3/1990 | Takata et al. | 310/323 |
| 4,965,482 | 10/1990 | Ohnishi et al. | 310/323 |
| 4,980,597 | 12/1990 | Iwao | 310/323 |
| 4,983,874 | 1/1991 | Yamaguchi | 310/323 |

FOREIGN PATENT DOCUMENTS

| | | | |
|---|---|---|---|
| 0401762 | 12/1990 | European Pat. Off. | 310/328 |
| 0294278 | 11/1988 | Japan | 310/323 |
| 0294281 | 11/1988 | Japan | 310/323 |

Primary Examiner—Mark O. Budd
Assistant Examiner—Thomas M. Dougherty
Attorney, Agent, or Firm—Oliff & Berridge

[57] ABSTRACT

A vibrator comprising an elastic member and two exciting members such as piezoelectric members, and an ultrasonic linear or rotary motor having the vibrator. One exciting member excites a longitudinal vibration in the elastic member in the length direction thereof and the other exciting member excites a flexural vibration in the elastic member in the thickness thereof, thereby providing substantially elliptical motion to the elastic member.

18 Claims, 5 Drawing Sheets

VIBRATOR AND ULTRASONIC MOTOR EMPLOYING THE SAME

BACKGROUND OF THE INVENTION

This invention relates to a vibrator and an ultrasonic motor employing the same, and more particularly to a vibrator for exciting substantially elliptical motion and an ultrasonic motor employing such a vibrator.

Conventionally, a standing-wave-type ultrasonic motor has been mainly used to achieve a high efficient vibration and a high output power. The conventional standing-wave-type ultrasonic motor operates by holding a moving element under a prescribed pressure against a vibrator which excites substantially elliptical motion and driving the moving element under frictional forces between the moving element and material points of a stator which make substantially elliptical motion.

As a conventional vibrator used in the conventional ultrasonic motor for exciting the substantially elliptical motion, a vibrator employing an elastic member having a particular shape, such as a cantilever type vibrator, a planar vibrator and the like, is used and various vibration modes such as shearing vibration, flexural vibration or the like is adopted. Further, in order to excite the substantially elliptical motion at a high efficiency, the vibrator employs a mechanical resonant system having a natural vibration mode which effects unidirectional vibration at the contact surface between the elastic member and an exciting member and which effects elliptical vibration at the contact surface between the elastic member and the moving member. The former examples are described in Japanese Laid-open Patent Publication Nos. 61-129077 and 62-262676, in Japanese Patent Application No. 63-97152 and in a collection of papers (A224, 225) of "ELECTRICAL INFORMATION COMMUNICATION LEARNED SOCIETY" in 1988, and the latter examples are described in Japanese Patent Application Nos. 63-97151 and 63-97152.

However, the above conventional vibrators have the following disadvantages.

In the cantilever type vibrator as shown in the Japanese Laid-Open Patent Publication 61-129077, it is difficult to completely fix an equilibrium point of vibration because the equilibrium point of the vibration is positioned at an end portion of a resonant member, so that the vibrator can not excite the substantially elliptical motion at high efficiency.

In the planar vibrator in which shearing vibration is excited in a planar resonant member, it is difficult to excite uniform shearing vibration to the vibrator because the boundary conditions at a fixed end portion of the planar resonant member are unstable and a strain occurs at a portion of the planar resonant member, so that vibration having large amplitude is not obtained at high efficiency.

In Japanese Laid-Open Patent Publication No. 62-262676, only one type of standing wave is used and therefore the control of the moving direction is not performed by only one motor.

In one of the above papers, "A SHEET FEEDING DEVICE (I) AND (II) USING A PLANAR PIEZOELECTRIC VIBRATOR" disclosing an ultrasonic motor in which a surface-vertically bending vibration mode is used, a torsional strain is applied to an piezoelectric element, and therefore the vibration of this ultrasonic motor is suppressed and an excitation efficiency becomes low.

In Japanese Patent Application Nos. 63-97151 and 63-97152, since strains are concentrated on a fixing portion at which an ultrasonic vibrator is fixed, it is difficult to perform a complete fixation and effect impedance matching. In addition, the boundary conditions at the fixing portion tend to become unstable, so that the ultrasonic motors of these prior arts do not operate stably. Further, since a vibration profile of an elastic member is changed by the fixing portion, a desired vibration is not necessarily obtained and a high efficient operation is difficult. Accordingly, the ultrasonic motor having the ultrasonic vibrator of these prior arts can not provide kinetic energy (output power) at high efficiency.

SUMMARY OF THE INVENTION

An object of this invention is to provide an ultrasonic vibrator which can be stably operated at high efficiency and in which substantially elliptical motion can be easily controlled to obtain vibration having large amplitude at high efficiency.

Another object of this invention is to equip an ultrasonic motor with the above vibrator, and to provide the ultrasonic motor which can be stably operated at high efficiency and in which a substantially elliptical motion can be easily controlled and a large output power can be obtained at high efficiency.

The above objects are attained by provision of the vibrator according to this invention, which comprises an elastic member and at least two exciting members, one exciting a longitudinal vibration in a predetermined direction of the elastic member and the other exciting a flexural vibration in a different direction from the predetermined direction of the elastic member.

The above objects are also attained by provision of the ultrasonic motor comprising the above vibrator and a movable member capable of receiving a vibration force from the vibrator and being movable in a predetermined direction.

DETAILED DESCRIPTION OF THE INVENTION

The preferred embodiment of this invention will be described with reference to the accompanying drawings.

Figure 1:
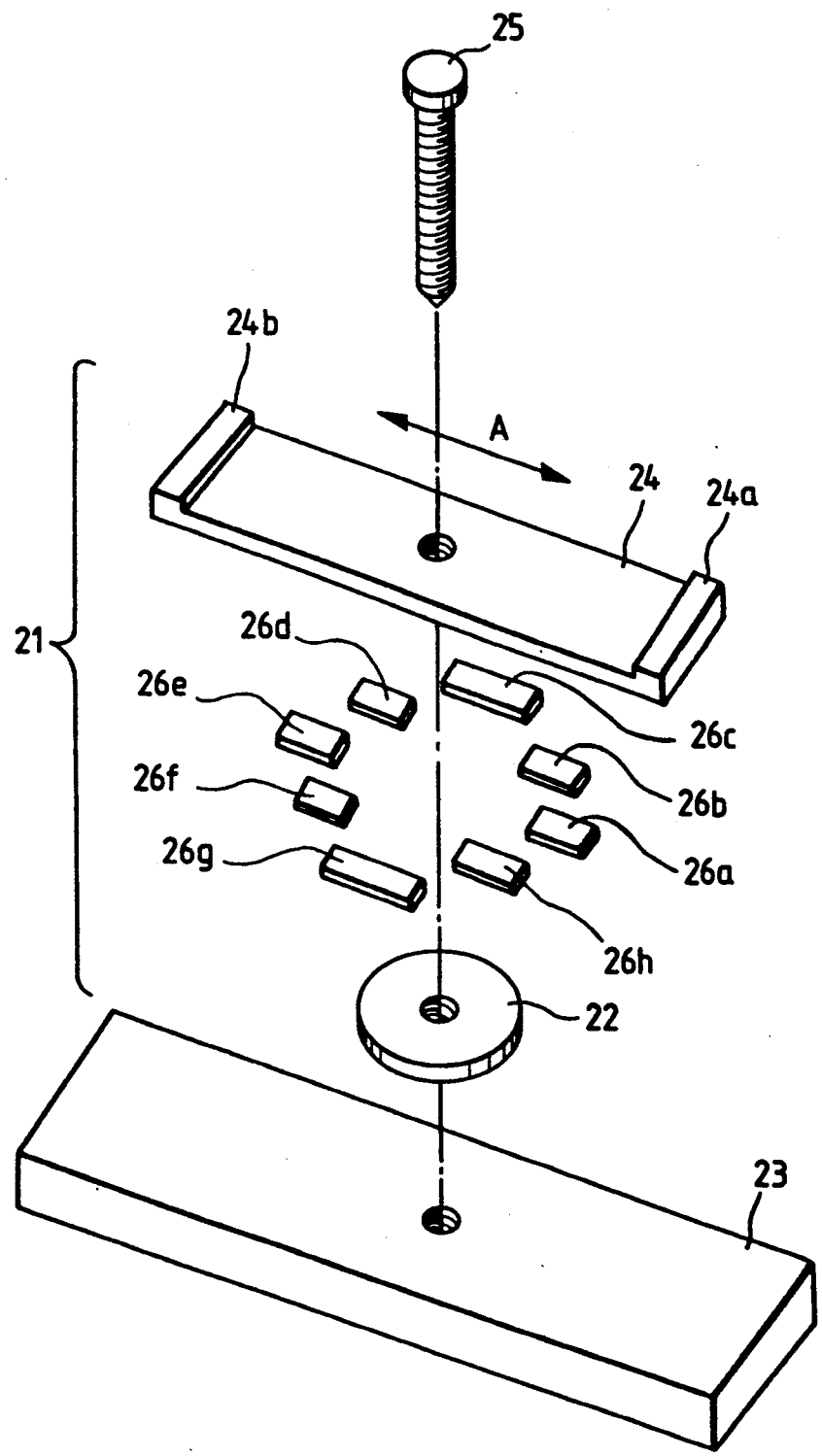
FIG. 1 is an exploded perspective view of a first embodiment of the vibrator of this invention.

FIG. 1 shows an exploded perspective view of a first embodiment of the vibrator according to this invention. A vibrator 21 comprises a mount 23, a first piezoelectric member 22 mounted fixedly on the mount 23 and a planar elastic member 24 having plural second piezoelectric members mounted in the lower surface thereof and output driving portions 24a and 24b projected from the both sides thereof. The mount 23, the first piezoelectric member 22 and the elastic member 24, each of which has a hole therein, are laminated in this order and are fixed to one another by a bolt 25 inserted through the holes. The hole of the elastic member is formed such that the elastic member has a symmetrical structure with respect to the hole when fixed by the bolt 25.

The first piezoelectric member 22 is provided with electrodes (not shown) at the upper and lower surfaces thereof and are polarized in the vertical direction to the upper and lower surfaces (in the thickness direction of the first piezoelectric member), whereby the piezoelectric member 22 is vibrated vertically (in the thickness direction). Further, each of the second piezoelectric members 26a to 26h is also provided with electrodes at the upper and lower surfaces thereof, and is vibrated in the direction as indicated by an arrow A in FIG. 2A (that is, parallel to the surface of the elastic member).

Figure 2A:
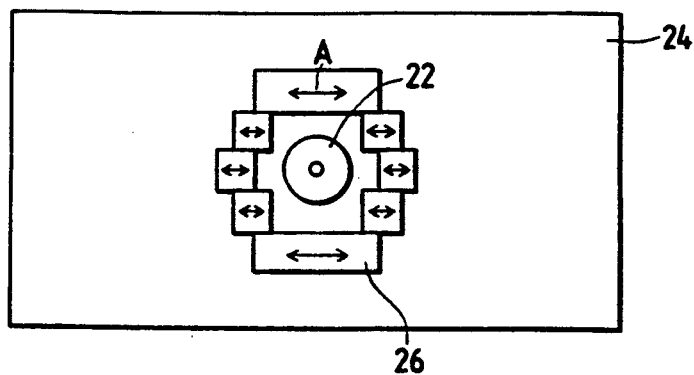
FIG. 2(A) shows an embodiment of the arrangement of the second piezoelectric members on the elastic member.

FIG. 2A shows one embodiment of the arrangement of the second piezoelectric members on the elastic member. The second piezoelectric members 26a to 26h are arranged on the lower surface of the elastic member 24 such that those members are circularly disposed in the neighboring of the fixing portion (hole) of the elastic member 24 and the polarizing directions thereof as indicated by the arrow A are in parallel with one another. Each of those members thus arranged is supplied with an alternating voltage through the electrodes on the upper and lower surfaces thereof to effect a expansion and contraction vibration (hereinafter referred to as "longitudinal vibration) in the thickness direction thereof.

Figure 2B:
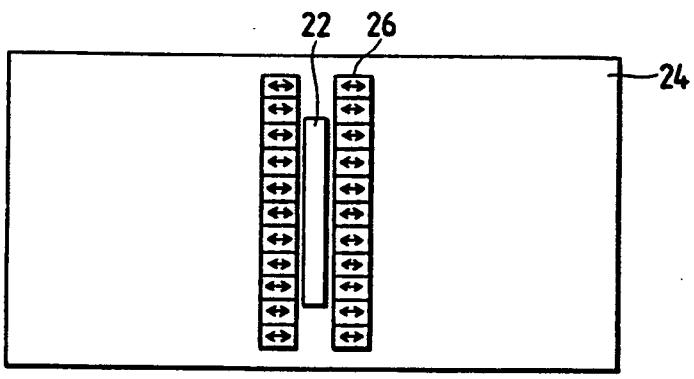
FIG. 2(B) shows another embodiment of the arrangement of the second piezoelectric members on the elastic member.

FIG. 2B shows another embodiment of the arrangement of the second piezoelectric members on the elastic member. Unlike the first piezoelectric member 22 of circular shape as shown in FIG. 1, the first piezoelectric member of this embodiment has a rod shape and the second piezoelectric members 26 are arranged on the elastic member 24 in such a manner as to be grouped into two rod-shaped arrays and to sandwich the first piezoelectric member 22 between the arrays. As shown in FIG. 2B, the polarizing directions of the second piezoelectric members are parallel with one another, and are substantially vertical to the longitudinal direction of each array.

The elastic member 24 resonates at a prescribed frequency f in a flexural vibration mode in the thickness direction thereof, and also resonates at the same frequency f in the longitudinal vibration mode in the length direction thereof. Further, a natural frequency of the longitudinal vibration generated in the planar elastic member is dependent upon the length of the elastic member 24, while a natural frequency of the flexural vibration in the thickness direction of the elastic member 24 is dependent upon the length and thickness of the elastic member 24. Accordingly, an planar elastic member having the same resonant frequency for the flexural vibration mode in the thickness direction and the longitudinal vibration mode in the length direction can be easily designed, and is used in this embodiment.

Figure 3A:
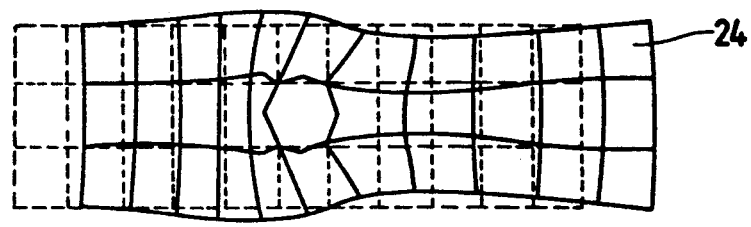
FIGS. 3(A) to 3(D) are diagrams for explaining longitudinal and flexural vibration modes of the vibrator as shown in FIG. 1.
Figure 3B:
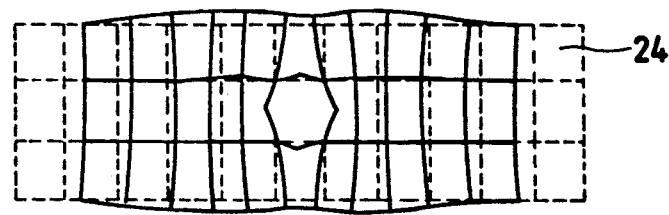
Figure 3C:
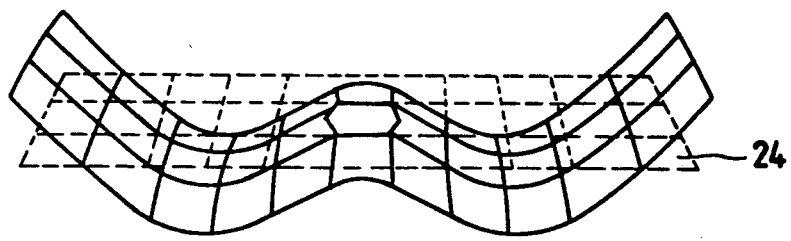
Figure 3D:
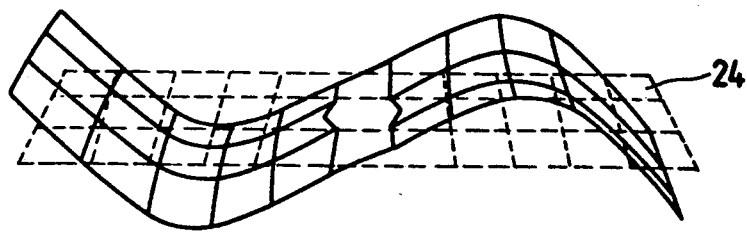

FIGS. 3A and 3B are diagrams for explaining the operation of the vibrator 21 when a longitudinal vibration is excited in the length direction of the elastic member, and FIGS. 3C and 3D are diagrams for explaining the operation of the vibrator 21 when a flexural vibration is excited in the thickness direction of the elastic member. In FIGS. 3A to 3D, a broken line shows the shape of a planar elastic member 24 when no vibration is excited, and a solid line shows the shape of the planar elastic member 24 when a vibration is excited. Here, a vibration frequency in the longitudinal vibration mode is represented by f1.

When each of the second piezoelectric members are supplied with an alternating voltage of frequency f1 to effect a vibration, the elastic member 24 is vibrated in the length direction thereof, for example in the lowest-order mode such that the both ends thereof are vibrated in the same direction as shown in FIG. 3A. The elastic member 24 may be vibrated such that the both ends thereof are vibrated in the opposite direction as shown in FIG. 3B.

When the first piezoelectric member 22 is supplied with an alternating voltage of the frequency f1 and then is vibrated in the thickness direction thereof as shown in FIG. 3A, in response to the vibration of the first piezoelectric member 22, the elastic member 24 is vibrated in the thickness direction thereof such that the both ends thereof are vibrated in the secondary flexural vibration mode in the same direction as shown in FIG. 3C. On the other hand, when the first piezoelectric member 22 is vibrated in the thickness direction thereof as shown in FIG. 3B, the elastic member 24 is vibrated in the thickness direction thereof such that the both ends are vibrated in the opposite direction as shown in FIG. 3D. When the vibration modes as shown in FIGS. 3A and 3C are simultaneously excited for the both ends of the elastic member 24, a substantially elliptical vibration is excited in the same direction for the both ends of the elastic member 24. Further, when the vibration modes as shown in FIGS. 3B and 3C are simultaneously excited for the both ends of the elastic member 24, the substantially elliptical vibration is also excited in the same direction for the both ends of the elastic member 24. Accordingly, an arbitrary shape can be provided with the substantially elliptical vibration by adjusting a phase difference between the alternating voltages applied to the electrodes on the upper and lower surfaces of the first and second piezoelectric members 22 and 26 and changing the amplitude of the alternating voltage applied to each piezoelectric member.

Figure 4:
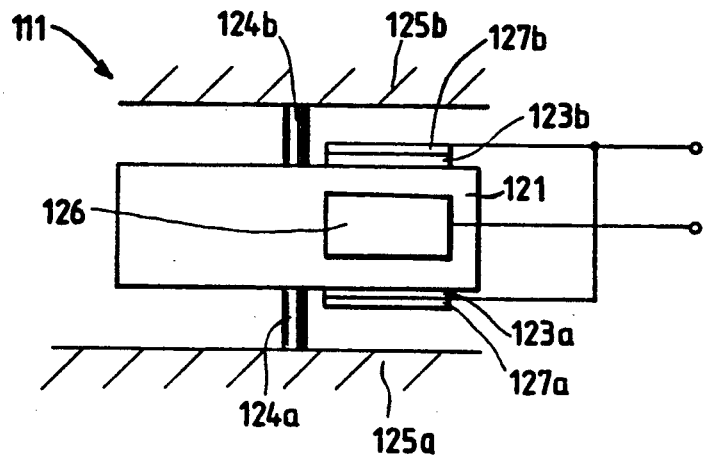
FIG. 4 is a top view of a second embodiment of the vibrator of this invention.
Figure 5:
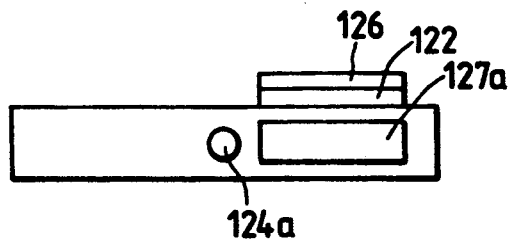
FIG. 5 is a side view of the vibrator as shown in FIG. 4.

FIG. 4 is a plan view of a second embodiment of the vibrator according to this invention, and FIG. 5 is a side view of the vibrator as shown in FIG. 4.

The vibrator 111 of this embodiment comprises a rectangular elastic member 121, a first piezoelectric member 122 for exciting a flexural vibration to the elastic member 121 and two second piezoelectric members 123a and 123b for exciting a longitudinal vibration to the elastic member 121. The first piezoelectric member 122 is mounted on the upper surface of the elastic member 121, and the second piezoelectric members 123a and 123b are oppositely mounted on the side surfaces of the elastic member 121, which are substantially vertical to the upper surface.

The elastic member 121 has a hole at the center of each of both side surfaces thereof, and is fixed by fixing bolts 124a and 124b one terminals of which are inserted into the holes of the both side surfaces and the other terminals of which are fixed to mounts 125a and 125b. In place of forming two holes at both side surfaces of the elastic member, a through hole penetrating the both side surfaces may be provided.

An electrode 126 is mounted on the upper surface of the first piezoelectric member 122, and electrodes 127a and 127b are mounted on the upper surfaces of the second piezoelectric members 123a and 123b, respectively. The elastic member 121 has also a function of a ground electrode, and is grounded through the fixing bolts 124a and 124b to the mounts 125a and 125b.

Figure 6A:
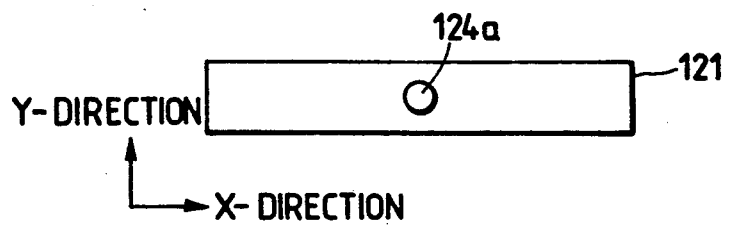
FIGS. 6(A) to 6(C) are diagrams for explaining longitudinal and flexural vibration modes of the vibrator as shown in FIGS. 4 and 5.
Figure 6B:
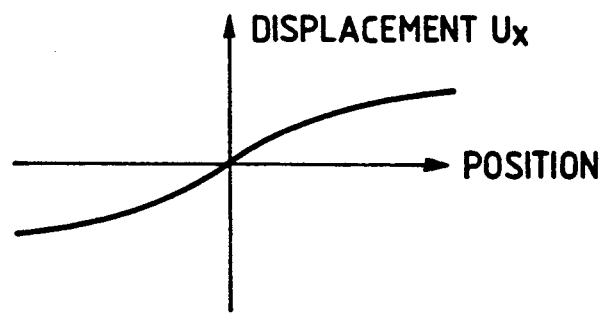
Figure 6C:
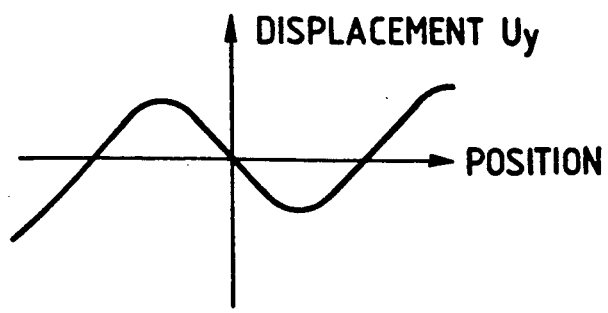

The elastic member 121 can be easily designed so that it is vibrated at a prescribed frequency f in a secondary flexural vibration mode in the thickness direction thereof with both ends thereof being free ends, and is vibrated at the same frequency f in a primary longitudinal vibration mode in the length direction thereof with both ends thereof being free ends, as shown in FIGS. 6A–6C. On the other hand, as described above, the resonant frequency of a longitudinal vibration wave propagating in the elastic member is dependent on the length of the elastic member and the resonant frequency of a flexural vibration wave propagating in the thickness direction of the elastic member is dependent on the length and thickness of the elastic member. Therefore, it is possible to design the elastic member in which the longitudinal and flexural vibrations are excited as shown in FIGS. 6A–6C at the frequency f. Like the first embodiment of the vibrator as described above, the vibrator of this embodiment also employs such an elastic member.

The operation of the vibrator of the second embodiment will be described below.

First, the first piezoelectric member 122 is vibrated by applying an alternating voltage of frequency f thereto to vibrate the elastic member 121 in a secondary flexural vibration mode and excite a standing wave having an amplitude distribution as shown in FIG. 6C. Next, the second piezoelectric members 123a and 123b are vibrated by applying an alternating voltage of frequency f thereto to excite the elastic member 121 in a primary longitudinal vibration mode and excite a standing wave having an amplitude distribution as shown in FIG. 6B. As shown in FIGS. 6A to 6C, the position at which the elastic member 121 is fixed by the bolts 124a and 124b corresponds to the nodes of the standing waves of the longitudinal and flexural vibrations.

Like the vibrator of the first embodiment of this invention, a substantially elliptical vibration is effected by simultaneously exciting the longitudinal and flexural vibrations to the free ends of the elastic member 121, and any shape can be provided to the substantially elliptical vibration by adjusting phases and amplitudes of voltages applied to the first and second piezoelectric members.

Figure 7:
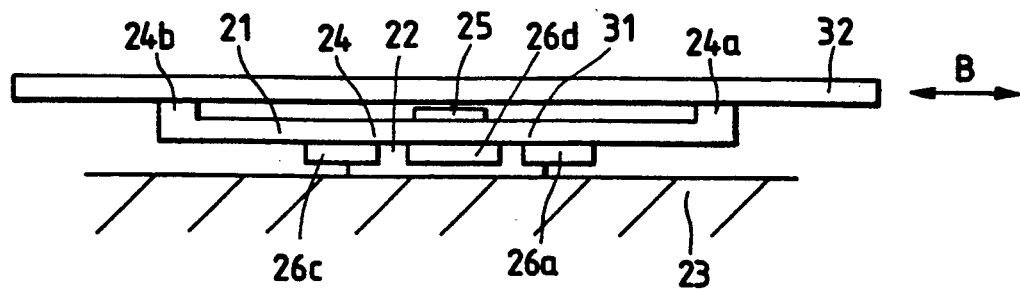
FIG. 7 is a cross sectional view of the ultrasonic linear motor adopting the vibrator as shown in FIG. 1.
Figure 8:
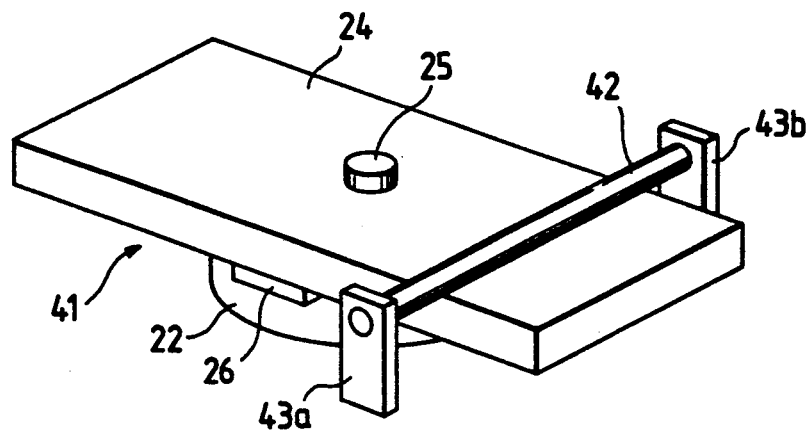
FIG. 8 is a perspective view of the ultrasonic rotary motor adopting the vibrator as shown in FIG. 1.

FIG. 7 is a cross sectional view of a ultrasonic linear motor in which the vibrator as shown in FIG. 1 and a moving element are used, and FIG. 8 is a perspective view of an ultrasonic rotary motor in which the vibrator as shown in FIG. 1 and the moving element are used.

In FIGS. 7 and 8, the same elements of this vibrator as those of the vibrator in FIG. 1 are designated by the same reference numerals.

The ultrasonic linear motor of this embodiment comprises the vibrator 21 as shown in FIG. 1 and a moving element 32 mounted on the output driving portions 24a and 24b under a pressure. When the vibrator 21 is vibrated simultaneously in longitudinal and flexural vibration modes, the moving element is moved by a driving force delivered from the elastic member in the direction as indicated by the arrow B (for example, horizontal direction) in synchronism with the substantially elliptical vibration of the elastic member 24. The driving force is caused by the change of frictional force between the elastic member 24 and the moving element 32.

In the ultrasonic rotary motor as shown in FIG. 8, a rotor 42 is disposed on the upper surface of the output driving portion 24 of the vibrator 21 in such a manner that the rotor 42 is in contact with the output driving portion in the direction vertical to that of the longitudinal vibration of the output driving portion 24. The rotor 42 is supported at both ends thereof by supporting rods 43a and 43b such a manner that it is rotatable by bearings (not shown).

According to the rotary type ultrasonic motor 41 thus constructed, when a longitudinal vibration and a flexural vibration are excited to the vibrator 21 to effect a substantially elliptical motion at the circumferential portion of the vibrator 21, a rotating force caused by the substantially elliptical motion of the vibrator 21 is delivered to the rotor 42, and the rotor 42 is rotated. Further, the substantially elliptical motion excited to the vibrator 21 can be provided with any shape by adjusting alternating voltages to be supplied to the first and second piezoelectric members 22 and 26. Accordingly, the rotating force supplied to the rotor 42 can be freely changed, and motor characteristics of the ultrasonic motor such as a rotational direction, a rotational number, an output torque, etc. can be freely adjusted. This freely adjustable motor characteristics enable the ultrasonic motor to be effectively operated even if a load is widely changed.

Figure 9:
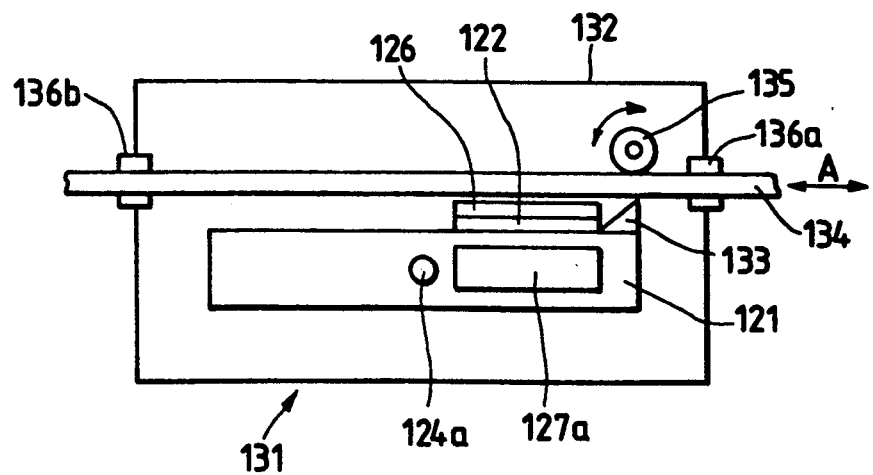
FIG. 9 is a side view of the ultrasonic linear motor adopting the vibrator as shown in FIGS. 4 and 5.

FIG. 9 is a side view of an ultrasonic linear motor in which the vibrator as shown in FIG. 4 and a moving element are used. In FIG. 9, the same elements as those in FIGS. 4 and 5 are designated by the same reference numerals.

The ultrasonic linear motor 131 of this embodiment comprises the vibrator as shown in FIGS. 4 and 5, a yoke for fixedly supporting the vibrator and a moving element 134. An output driving portion 133 is formed at one end of the elastic member 121 such that it is in contact with the moving element under a pressure by a rubber roller 135. The moving element is slidably supported by linear bearings 136a and 136b which are fixed to the yoke 132.

According to the ultrasonic linear motor 131 thus constructed, when a vibration is excited to the vibrator 111, the moving element 134 is supplied with a driving force from the elastic member 121, and is moved in the direction as indicated by the arrow A. The driving force originates in a substantially elliptical vibration of the elastic member 121 and is delivered through a frictional force between the elastic member 121 and the moving element 134.

In the embodiments of the ultrasonic motor as described above, a primary longitudinal vibration mode and a secondary flexural vibration mode are used. However, higher-order vibration modes can be used if the resonant frequency of the longitudinal vibration is substantially equal to that of the flexural vibration and the nodes of those vibrations are formed at least one same position.

In the embodiments as described above, the piezoelectric members are employed as driving elements for driving the vibrator. However, the principles of the present invention are not limited to the use of piezoelectric members, but other devices capable of converting electric energy to mechanical energy, such as electrostrictive devices, magnetostrictive devices, or the like may be employed as vibrator driving elements. Further, in the embodiments as described above, the vibrator has a planar shape. However, a vibrator having any various other shape, such as a circular, rod or rectangular shape, may be utilized insofar as it can excite an expansion and contraction (longitudinal) vibration in the length direction of the vibrator and a flexural vibration in the thickness (axis) direction of the vibrator to effect a substantially elliptical motion. Still further, in the embodiments as described above, the ultrasonic motor is designed so that the moving element is moved by the substantially elliptical motion of the vibrator. However, the ultrasonic motor may be designed so that the moving element is fixed and the vibrator is moved in a predetermined direction. At any rate, any construction may be provided to the ultrasonic motor insofar as the moving element is moved relatively to the vibrator.

As described above, according to one aspect of this invention, the positions of the nodes of the longitudinal and flexural vibrations are incident with each other and the vibrator is fixed at the position where no vibration occurs for the longitudinal and flexural vibrations, so that the operation of the vibrator is stable and a vibration having high amplitude is obtained at high efficiency.

Further, the elastic member of the vibrator has a symmetrical structure with respect to the fixing position thereof, so that the equilibrium point of the vibration is made a completely fixed end and a highly efficient vibration is obtained.

Still further, exciting members are fixedly mounted in the neighboring of the fixing portion, so that the vibration of the exciting members is not prevented and an excitation efficiency is increased.

Still further, according to another aspect of this invention, the ultrasonic motor adopting the vibrator as described above can be provided with highly efficient and output characteristics and can be easily controlled in the substantially elliptical motion.

What is claimed is:

1. A vibrator, comprising:
   an elastic member extending in a longitudinal direction and having at least a first plane surface and a second plane surface substantially perpendicular to said first plane surface;
   a first exciting member mounted on said first plane surface for exciting a longitudinal vibration causing compression across a cross section of said elastic member and forming a first standing wave corresponding to the longitudinal vibration in said elastic member in a first direction parallel to the longitudinal direction; and
   a second exciting member mounted on said second plane surface for exciting a flexural vibration and forming a second standing wave corresponding to the flexural vibration in said elastic member in a second direction different from said first direction, thereby providing substantially elliptical motion to said elastic member.

2. A vibrator as claimed in claim 1, further comprising a fixing member for fixing at a predetermined position of said elastic member.

3. A vibrator as claimed in claim 2, wherein said predetermined position corresponds to the position of each node of said first and second standing waves.

4. A vibrator as claimed in claim 2, wherein at least one of said first and second exciting members is mounted in the neighborhood of said predetermined position on said elastic member.

5. A vibrator as claimed in claim 2, wherein said elastic member is fixed by said fixing member such that said elastic member has a symmetrical structure with respect to said predetermined position.

6. A vibrator as claimed in claim 2, wherein said second exciting member is fixedly mounted on the lower surface of said elastic member in such a manner that said second exciting member surrounds said predetermined position.

7. A vibrator as claimed in claim 2, further comprising a mount for mounting said first exciting member thereon.

8. A vibrator as claimed in claim 7, wherein said elastic member, said first exciting member and said mount are laminated in this order and are fixed by said fixing member.

9. A vibrator as claimed in claim 2, wherein said first and second standing waves have at least one common node in said elastic member and said fixing member has an axis extending in a direction, and wherein said at least one common node is located in the direction of the axis of said fixing member and at least said first direction is perpendicular to the direction of the axis.

10. A vibrator as claimed in claim 1 further comprising a fixing member for fixing at a predetermined position of said elastic member.

11. A vibrator as claimed in claim 10, wherein said one position corresponds to that of each node of said first and second standing waves.

12. A vibrator as claimed in claim 1, wherein said elastic member is of a planar type.

13. A vibrator as claimed in claim 1, wherein said first and second exciting members comprise piezoelectric members.

14. A vibrator as claimed in claim 1, wherein said first and second directions are substantially perpendicular to each other.

15. An ultrasonic motor, comprising:
   a vibrator comprising an elastic member extending in a longitudinal direction, a first exciting member for exciting a longitudinal vibration causing compression across a cross section of said elastic member and forming a first standing wave corresponding to the longitudinal vibration in said elastic member in a first direction parallel to the longitudinal direction, said first standing wave having at least one node, a second exciting member for exciting a flexural vibration and forming a second standing wave corresponding to the flexural vibration in said elastic member in a second direction different from said first direction, thereby providing substantially elliptical motion to said elastic member, said second standing wave having at least one node, and a fixing member for fixing at least one position of said elastic member, wherein said at least one position corresponds to the position of at least one node of each of said first and second standing waves; and a moving element for receiving a driving force originated in the substantially elliptical motion of said elastic member and moving in a predetermined direction relative to said vibrator in accordance with the substantially elliptical motion, and moving element being in contact with said elastic member.

16. An ultrasonic motor as claimed in claim 15, wherein said elastic member is of a planar shape and two projections are provided at both end portions of said elastic member in said first direction, and wherein said moving element is in contact with said projections.

17. An ultrasonic motor as claimed in claim 15, wherein said moving element comprises a rotatable rod, said rotatable rod being in contact with said elastic member and rotating in accordance with the substantially elliptical motion of said elastic member.

18. A vibrator as claimed in claim 15, wherein said first and second standing waves have at least one common node in said elastic member and said fixing member has an axis extending in a direction, and wherein said at least one common node is located in the direction of the axis of said fixing member, and said first direction is substantially perpendicular to said second direction and at least said first direction is perpendicular to the direction of the axis.

* * * * *